(12) United States Patent
Lawrence (10) Patent No.: US 8,527,400 B2
(45) Date of Patent: Sep. 3, 2013

(54) AUTOMATED ACCOUNT RISK MANAGEMENT

(75) Inventor: David Lawrence, New York, NY (US)

(73) Assignee: Goldman, Sachs & Co., New York, NY (US)

( * ) Notice: Subject to any disclaimer, the term of this patent is extended or adjusted under 35 U.S.C. 154(b) by 2312 days.

(21) Appl. No.: 09/812,628

(22) Filed: Mar. 20, 2001

(65) Prior Publication Data

US 2002/0138408 A1    Sep. 26, 2002

(51) Int. Cl.
*G06Q 40/00* (2012.01)

(52) U.S. Cl.
USPC ............................................. 705/38; 705/39

(58) Field of Classification Search
USPC ....................................................... 705/38, 39
See application file for complete search history.

(56) References Cited

U.S. PATENT DOCUMENTS

| | | | |
|---|---|---|---|
| 5,177,342 A | 1/1993 | Adams | |
| 6,078,904 A | 6/2000 | Rebane | |
| 6,085,175 A | 7/2000 | Gugel et al. | |
| 6,119,103 A | 9/2000 | Basch et al. | 705/35 |
| 6,317,727 B1 | 11/2001 | May | 705/37 |
| 6,415,271 B1 * | 7/2002 | Turk et al. | 705/39 |
| 6,421,653 B1 * | 7/2002 | May | 705/37 |
| 2001/0011243 A1 | 8/2001 | Dembo et al. | 705/36 |
| 2002/0019804 A1 | 2/2002 | Sutton | 705/38 |
| 2002/0046053 A1 | 4/2002 | Hare et al. | 705/1 |
| 2002/0099640 A1 | 7/2002 | Lange | 705/37 |
| 2002/0111890 A1 | 8/2002 | Sloan et al. | 705/36 |
| 2002/0143686 A1 * | 10/2002 | Greene et al. | 705/37 |
| 2003/0135457 A1 * | 7/2003 | Stewart et al. | 705/39 |
| 2005/0086090 A1 * | 4/2005 | Abrahams et al. | 705/7 |

FOREIGN PATENT DOCUMENTS

| | | |
|---|---|---|
| WO | WO 00/75836 A2 | 12/2000 |
| WO | WO 01/55885 A2 | 8/2001 |

OTHER PUBLICATIONS

Kevin Dowd, Beyond Value at Risk: The New Science of Risk Management, 1998, John Wiley & Sons, pp. 3-5 & 38-40.*
Weighted Average. Dictionary of Economics, Wiley (1995). Retrieved Oct. 12, 2005 from xreferplus. http://www.xreferplus.com/entry/2766104. 2 pages.*
Hansen, Fay. "Business credit: the revolution in online credit resources". Business Credit. New York: Oct. 2000. vol. 102, Iss. 9. (6 pages from ProQuest).*
Welsh, James. "Covering your bets on credit and collections". World Trade. Troy: Feb. 1999. vol. 12, Iss. 2. (4 pages from ProQuest).*
Banasiak, Michael "Don't Be Out-Scored by Your Competition", *Credit and Financial Management Review*, 2nd Quarter 2000, 8pgs., download from http://www.paynetonline.com/viewpaf.asp on Apr. 15, 2002. © 2000 Predictive Business Decision Systems, Inc.
Co-Pending U.S. Appl. No. 09/772,427, Applicant Lawrence, filed Jan. 30, 2001.
Int'l Search Report dated Jan. 27, 2003 for PCT/US02/07243.

* cited by examiner

*Primary Examiner* — Thomas Dixon
*Assistant Examiner* — Benjamin S Fields
(74) *Attorney, Agent, or Firm* — Perkins Coie LLP (57) ABSTRACT

A computerized system and method for structuring risk management and assist a financial institution quantify financial, legal, regulatory and reputational risk associated with opening accounts related to management of financial assets and investments and facilitate analysis and quantification of risk. An automated account opening risk management system receives information quantifying factors relating to financial, legal, regulatory and/or reputational risk. The information is utilized to generate a risk quotient or other rating based upon a weighting algorithm applied to the criteria. The risk quotient is indicative of risk associated with an account. The quotient can be monitored on account opening, periodically or during a transaction. A log or other stored history can be created to help mitigate adverse effects relating to a problematic account by demonstrating to regulatory bodies, shareholders, news media and other interested parties that corporate governance is being addressed through tangible risk management processes.

21 Claims, 5 Drawing Sheets

| Category Weighting (0 to 10) | | 3 | Response Value | Response Score |
|---|---|---|---|---|
| 1. What is the ownership structure of the company? | Public entity | | -5 | 0 |
| | Private entity | X | 5 | 5 |
| | Government entity | | 0 | 0 |
| 2. Were does the company maintain its head office? | United States / Canada | X | 0 | 0 |
| | Latin / South America | | 5 | 0 |
| | Western Europe | | 0 | 0 |
| | Eastern Europe | | 7 | 0 |
| | Russian Federation | | 10 | 0 |
| | Middle East | | 9 | 0 |
| | Africa | | 7 | 0 |
| | South Asia | | 5 | 0 |
| | Japan | | 2 | 0 |
| | Southeast Asia | | 5 | 0 |
| | Australia / New Zealand | | 0 | 0 |
| 3. In what industry does the company generally operate? | Communications Services | X | 5 | 5 |
| | Consumer Products / Services | | 3 | 0 |
| | Financial Services | | 3 | 0 |
| | Healthcare | | 5 | 0 |
| | Industrial Equipment | | 3 | 0 |
| | Natural Resources | | 3 | 0 |
| | Technology | | 5 | 0 |
| | Transportation | | 3 | 0 |
| | Utilities | | 0 | 0 |

Mark box with "x" to indicate selected response.

FIG. 4

AUTOMATED ACCOUNT RISK MANAGEMENT

BACKGROUND

This invention relates generally to the identification, investigation, assessment and management of legal, regulatory and reputational risks ("Risks"). In particular, the present invention relates to a computerized system and method for structuring risk management models designed to assist a financial institution quantify financial, legal, regulatory and reputational risk associated with opening accounts related to management of financial assets and investments.

Bank and non-bank financial institutions, including: investment banks; merchant banks; commercial banks; securities firms, including broker dealers securities and commodities trading firms; asset management companies, hedge funds, mutual funds, credit rating funds, securities exchanges and bourses, institutional and individual investors, law firms, accounting firms, auditing firms and other entities, hereinafter collectively referred to as "financial institutions," typically have few resources available to them to assist in the identification of present or potential risks associated with opening a particular investment or trading account. Risk can be multifaceted and far reaching. Generally, personnel interfacing with a client have minimal understanding of the issues involved relating to risk. Nor do the personnel have available a mechanism to provide real time assistance to assess a risk factor or otherwise qualitatively manage risk. In the event of investment problems, it is often difficult to quantify to regulatory bodies, shareholders, newspapers and other interested parties, the diligence exercised by the financial institution to properly identify and respond to risk factors. Absent a means to quantify good business practices and diligent efforts to contain risk, a financial institution may appear to be negligent in some respect.

Risk associated with opening an investment account can include factors associated with financial risk, legal risk, regulatory risk, credit risk and reputational risk. Financial risk can include factors indicative of monetary costs that the financial institution may be exposed to as a result of opening a particular account and/or transacting business with a particular client. Monetary costs can be related to fines, forfeitures, cost to defend an adverse position, or other related potential sources of expense. Credit risk relates to factors that can adversely affect a party's ability to borrow money. Regulatory risk can include factors that may cause the financial institution to be in violation of rules put forth by a regulatory agency such as the Securities and Exchange Commission (SEC), Federal Reserve Board, a stock exchange or international counterparts. Regulatory risk can be particularly important in light of ongoing increased scrutiny of business practices which can result in managerial distraction and loss of management time. Reputational risk relates to harm that a financial institution may suffer regarding its professional standing in the industry. A financial institution can suffer from being associated with a situation that may be interpreted as contrary to an image of honest and forthright corporate governance. Detrimental effects can include a significant loss of business and client confidence.

What is needed is a method and system to assist in due diligence relating to opening accounts involved in financial transactions. A new method and system should anticipate offering guidance to personnel who interact with clients and also be situated to convey information relating to risk to a compliance department, and assist in prioritization and/or evaluation of how serious or important a situation may be. It should be able to demonstrate to regulators that a financial institution has met standards relating to risk containment.

SUMMARY

Accordingly, the present invention provides a risk management method and system for facilitating analysis and quantification of risk. An automated account opening risk management system receives information quantifying factors relating to financial, legal, regulatory and/or reputational risk. The information is utilized to assess criteria relating to such factors and generate a risk quotient or other rating based upon weighted algorithm applied to the criteria. The risk quotient is indicative of risk associated with an account. The quotient can be monitored on account opening or during the course of transactions. A log or other stored history can be created such that utilization of the system can mitigate adverse effects relating to a problematic account by demonstrating to regulatory bodies, shareholders, news media and other interested parties that corporate governance is being addressed through tangible risk management processes. An implementing institution may include, for example, a bank, a trading institution, an insurance company, a credit card issuer, a trading exchange, a government regulator or a law enforcement agency.

A computer can implement a method for managing risk related to a client account, the method can include receiving information relating to a client account and structuring the information received according to risk quotient criteria. A weight can be associated with the risk quotient criteria such that a risk quotient can be calculated utilizing the information structured according to risk quotient criteria and the associated risk quotient criteria. A suggested action responsive to the risk quotient and/or information received can be generated, as well as a due diligence report based upon data stored in a risk quotient criteria database. The suggested action is typically directed towards reducing risk associated with the client account, such as blocking the opening of an account or notifying an authority concerning information received.

Information can be received in a pre-structured format or structured to conform to a database after receipt. Stored data can include information received, a risk quotient and a suggested action. The due diligence report can include inquiries made relating to the account and actions taken responsive to the risk quotient.

A graphical user interface can be presented to a network access device and display questions. Input responsive to the questions can be received into the network access device. Information relating to the client account can also be received from an source of electronic data.

Risk assumed by a financial institution can be calculated as the risk is represented by the risk quotient, such as, for example, aggregating risk quotients in order to calculate a total risk assumed by a financial institution or calculating an average risk quotient associated with a transaction. A risk quotient can be calculated by multiplying a numerical value representative of a risk associated with a risk criteria times a numerical value indicative of a category weighting.

The present invention can also be embodied as a computerized system for managing risk associated with a client account, a computer executable program code residing on a computer-readable medium, or a computer data signal embodied in a digital data stream.

In another aspect, a computer system for providing risk management relating to opening accounts can include a computer server that is accessible with a network access device via a communications network; and executable software stored on the server and executable on demand via the network access device. The software operative with the server to can be utilized to receive information relating to risk management factors and formulate a risk quotient or rating.

Other embodiments can include a computer executable program code residing on a computer-readable medium or a computer data signal embodied in a digital data stream. Various features and embodiments are further described in the following figures, drawings and claims.

DETAILED DESCRIPTION

The present invention includes a computerized method and system for managing risk associated with opening an account created for performing financial transactions. Information relating to financial, legal, regulatory and/or reputational risk is input into a computer system. The computer system applies an algorithm that weights the input information and calculates a risk quotient or similar rating. The risk quotient can include a scaled numeric or alpha-numeric value.

If an account exceeds a risk quotient threshold, the system responds with a predetermined action. Actions can include, for example, blocking acceptance of an account, creating a report, generating an alert, notifying a compliance department, or other appropriate response. In addition, the system can create a structured history relating to a new account that can demonstrate due diligence and proper corporate governance. Reporting can be generated from the structured history.

Figure 1:
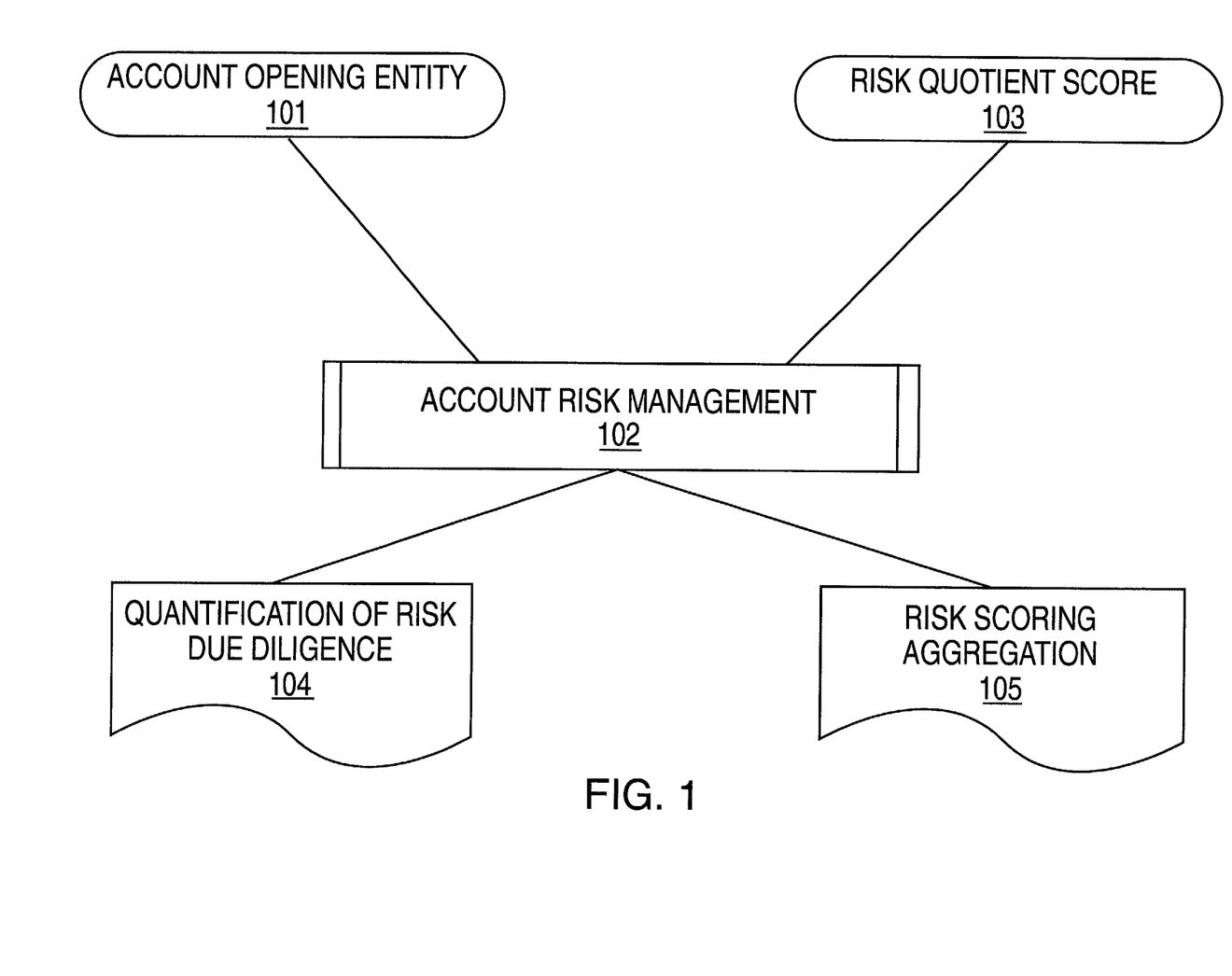
FIG. 1 illustrates a block diagram which can embody this invention.

Referring now to FIG. 1 a block diagram of one embodiment of the present invention is illustrated. An account opening entity 101, such as a sales representative or a programmable robot, supplies information into an Account Risk Management System (ARM) 102. The information can be responsive to a predetermined set of questions. In one embodiment, questions or other prompts can be viewed on a graphical user interface (GUI) and in turn ask a client, such as an account opener, appropriate questions during an account opening interview. In the case of an automated account opening, such as for example, opening an online account, questions can be presented to the account opener by a programmable robot via a GUI. Questions can relate to a particular type of account, a particular type of client, types of investment, or other criteria. In addition, the questions can depend upon previous answers. Information received in response to the questions can be input into the ARM 102 and utilized for real time risk assessment and generation of a risk quotient 103.

The risk assessment and risk quotient 103 can subsequently be made available to an account opening entity 101 in real time and provide guidance on a suggested next step for the account opening entity 101 to take, or notify an additional party regarding the risk assessment and suggested next steps.

A history, log, or other stored history can capture questions considered by the account opening institution. In addition, information gathered, steps taken and other due diligence can be compiled by the ARM 102. Such quantification can be utilized for presentation to regulatory bodies, shareholders, news media and/or other interested parties to mitigate adverse effects relating to a problematic account. The history can demonstrate that corporate governance is being addressed through tangible risk management processes.

The risk quotient 103 can also be used to perform calculations on risk experienced by the account holding institution as represented by the risk quotient. For example, an aggregate, sum, mean, or other calculation can be made according to the risk quotients relating to account risk. In this manner, an institution can analyze risk according to an algorithm such as an average or mean risk assumed by the institution, its branch locations or a particular client representative. In addition, the ARM 102 can aggregate risk 105 according to the risk quotient 103 and calculate a total risk assumed by the financed institution.

Figure 2:
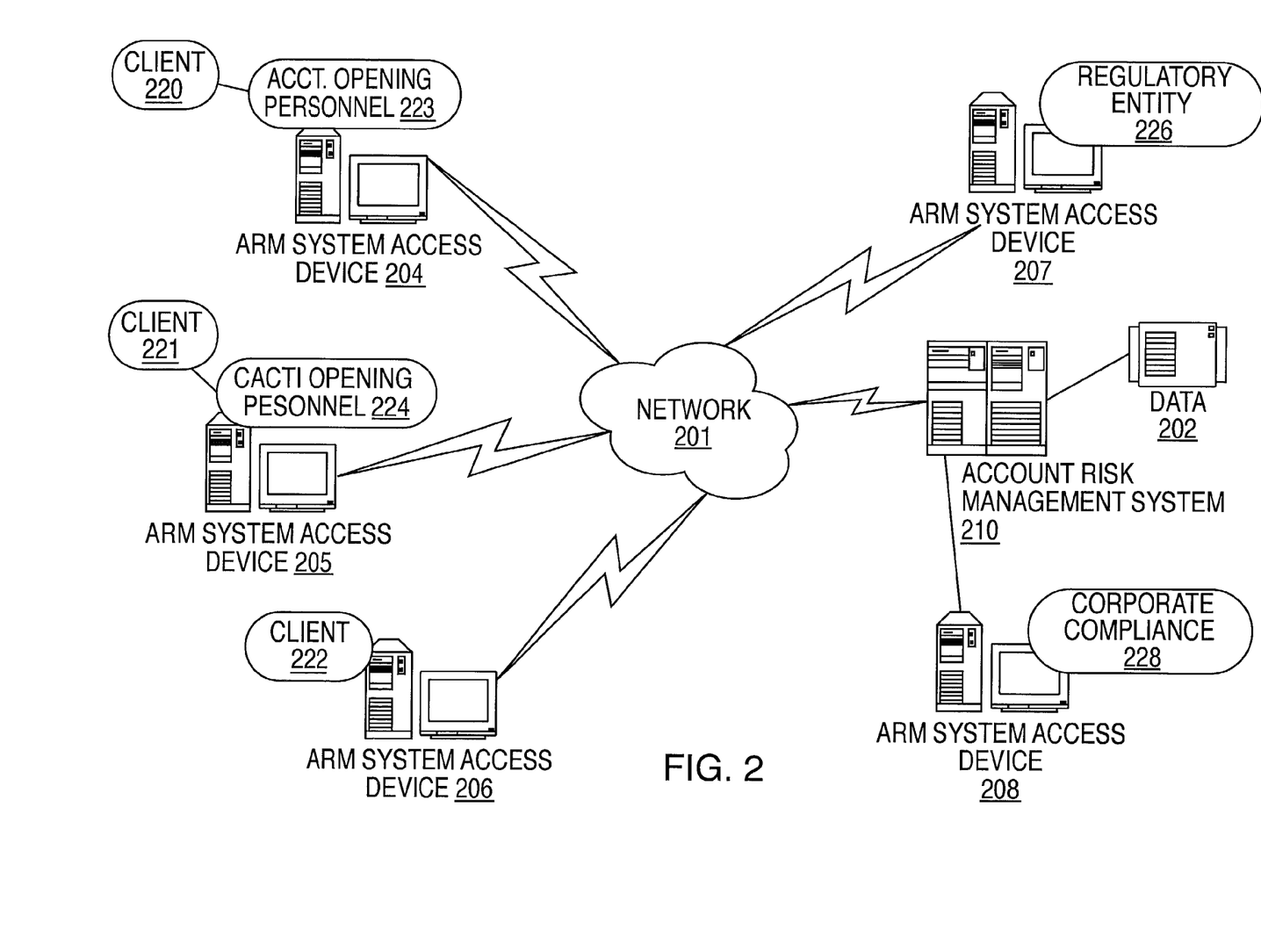
FIG. 2 illustrates a network on computer systems that can embody an enhanced online sales risk management system.

Referring now to FIG. 2, a network diagram illustrating one embodiment of the present invention is shown. An automated account risk management system can include an ARM System 210 accessible via a distributed network 201 such as the Internet, or a private network. A client 220-222, regulatory entity 226, corporate compliance 228 or other party interested in account management can use a computerized system or network access device 204-208 to receive, input, transmit or view information processed in the ARM system 210. A protocol, such as the transmission control protocol internet protocol TCP/IP can be utilized to provide consistency and reliability.

Each of the network access devices can include a processor, memory and a user input device, such as a keyboard and/or mouse, and a user output device, such as a display screen and/or printer. The network access devices 204-208 can communicate with the ARM system 210 to access data stored at the ARM system 210. The network access device 204-208 may interact with the host computer 250 as if the host was a single entity in the network 200. However, the ARM system 210 may include multiple processing and database sub-systems, such as cooperative or redundant processing and/or database servers, that can be geographically dispersed throughout the network 201. In some implementations, groups of network access devices 204-208 may communicate with ARM system 210 through a local area network.

The ARM system 210 includes one or more databases 202 storing data relating to account opening. The ARM system 210 may interact with, and/or gather data from a client 220-222, regulatory entity 226, corporate compliance 228, account opening personnel 223-224 or other person who is operating a network access device 204-208. Data gathered from an operator may be structured according to risk criteria and utilized to calculate a risk quotient.

Typically a user will access the ARM system 210 using client software executed at a network access device 204-208. The client software may include a generic hypertext markup language (HTML) browser, such as Netscape Navigator or Microsoft Internet Explorer, (a "WEB browser"). The client software may also be a proprietary browser, and/or other host access software. In some cases, an executable program, such as a Java™ program, may be downloaded from the ARM system 210 to the client computer and executed at the client computer as part of the ARM system software. Other implementations include proprietary software installed from a computer readable medium, such as a CD ROM. The invention may therefore be implemented in digital electronic circuitry, computer hardware, firmware, software, or in combinations of the above. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

Figure 3:
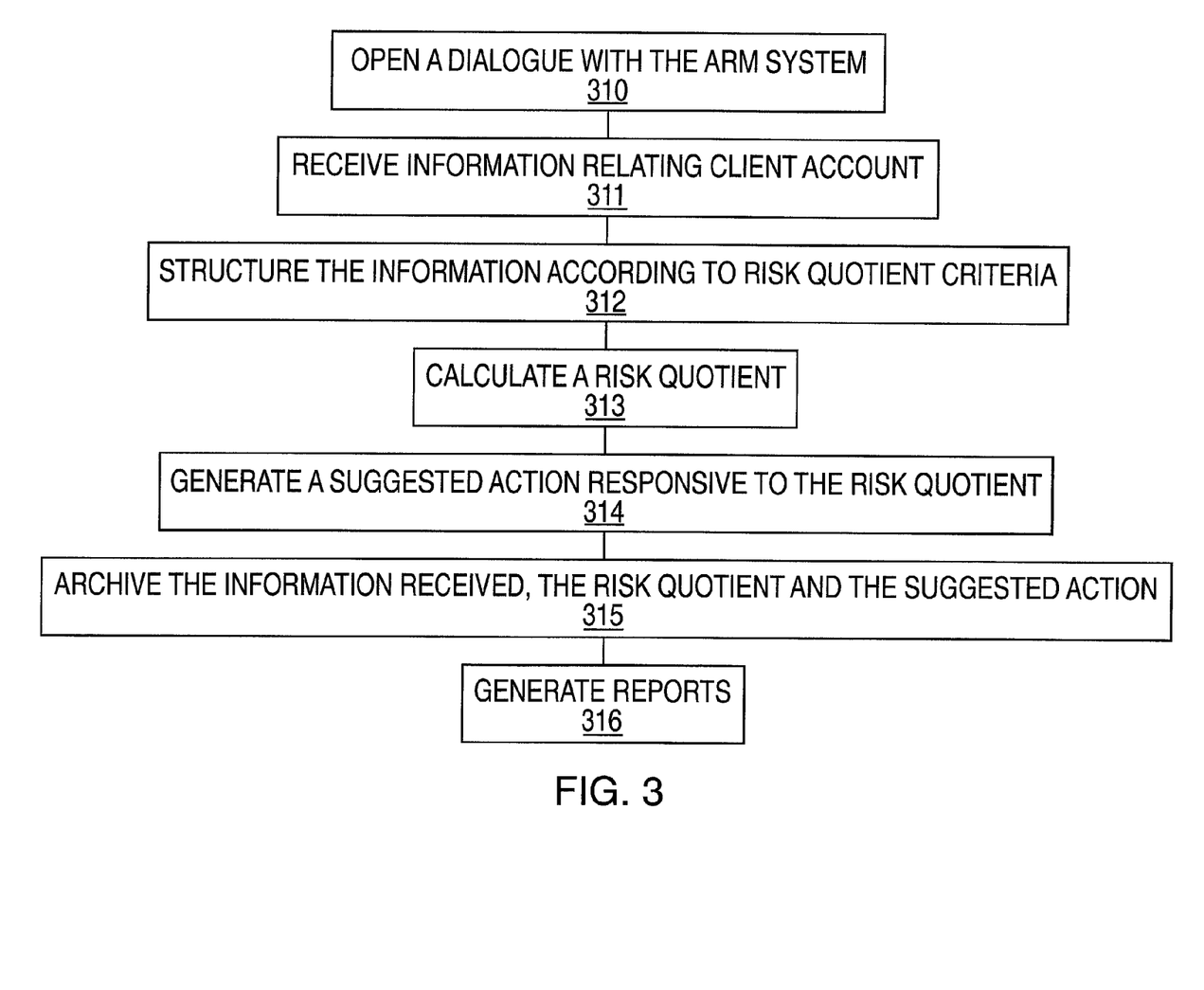
FIG. 3 illustrate a flow of exemplary steps that can be executed in practicing account risk management.

Referring now to FIG. 3, managing risk associated with opening an account related to financial transactions can begin with opening a dialogue with an ARM system 310. Typically, the dialogue would be opened by presenting a GUI to a network access device accessible by person who will enter information relating to the account opener. The GUI will be capable of accepting data input via the network access device. An example of an GUI would include a series of questions relating to the client seeking to open the account. The questions can be displayed on a GUI referenced in an account opening interview with a sales person or clerk, or answered via an online form. In the event of an account opening interview with a sales person, the sales person can, in turn, enter the information received orally into an online form.

Alternatively, a dialogue can also be opened with a source of electronic data such as an external database or messaging system, including a live data feed of market data or news, a commercial database service, or a subsidiary office. In either case, the dialogue will enable the ARM system 102 to receive data relating to the client account 311.

The ARM system 102 can structure the information received according to defined risk quotient criteria 312 and a weighted score. Structuring information can include allocating it to an appropriate data field in an associated database. For example, information received can include what type of account is being opened. Types of accounts to be opened may include: an individual account, a public company domiciled in a G-7 country or Hong Kong; a public company not domiciled in a G-7 country or Hong Kong, a corporate account regulated by a G-7 agency or a corporate account regulated by a non G-7 government agency; a private company or partnership, a holding company, an intermediary managed account such as a money manager or hedge fund, a trust or foundation, or other type of legal entity or financial institution as defined above. Weighted scores can correlate to the importance of the data field.

In one embodiment, the ARM system can receive the information in a pre-structured format. Pre-structuring can be accomplished for example by a network access device 204-208 or a source of electronic data. The pre-structured data can have information received associated with, and formatted for, a destination field in a risk criteria database 202. Receiving the information in a pre-structured format allows the ARM system 102 to proceed with calculating a risk quotient 313 without having to further structure the information.

Calculating a risk quotient can be accomplished by assigning a numerical value representative of a risk associated with a particular piece of information. Values for the criteria can be assigned according to their potential risk. For example, it may be determined that a public company in a G-7 country poses minimal risk, therefore this information is assigned a low numerical value, or even a negative numerical value. Similarly, a corporate holding company may be viewed as indicative of a high risk and information conveying this may be assigned a high numerical value. Data points and/or responses received may have independent and/or dependant correlation with an overall risk quotient. In addition, a weight can be assigned to the risk category to which the information is assigned according to the relative importance of the data the category holds. In addition, a weight to one data field can be modified in response to a value entered into a related field. A criteria score can be calculated by multiplying the numerical value representative of the risk associated with a risk criteria times the category weighting.

For example, information received may indicate the ownership structure of a company is a public entity. A public entity may receive a numerical value of −5 because it is a relatively low risk ownership structure. In addition, this information may be included in a Company Profile category, wherein the Company Profile is assigned a category weighting of 3. Therefore, the net score for this information is −5 times 3 or −15. All scores within the Company Profile are summed to calculate a weighted risk score. Weighted risk scores from all associated categories are summed to calculate a total weighted risk score, or Risk Quotient.

A suggested action can be generated that is responsive to the Risk Quotient 314. For example, in response to a high risk score, a suggested action may be to cancel the account or even to notify an authority. In response to a low risk score, the ARM system 102 may respond by opening the account. Intermediate scores may respond by suggesting that additional information be gathered, or that transactions for this account be monitored.

The ARM system 102 can also store, or otherwise archive ARM data and proceedings. For example the ARM system 102 can store information received, and also generate a Risk Quotient and suggested actions to be taken 315. This information can be useful to quantify corporate governance and diligent efforts to address high risk situations. Accordingly, reports quantifying the risk management procedures, executed due diligence, corporate governance or other matters can be generated 316.

Figure 4:
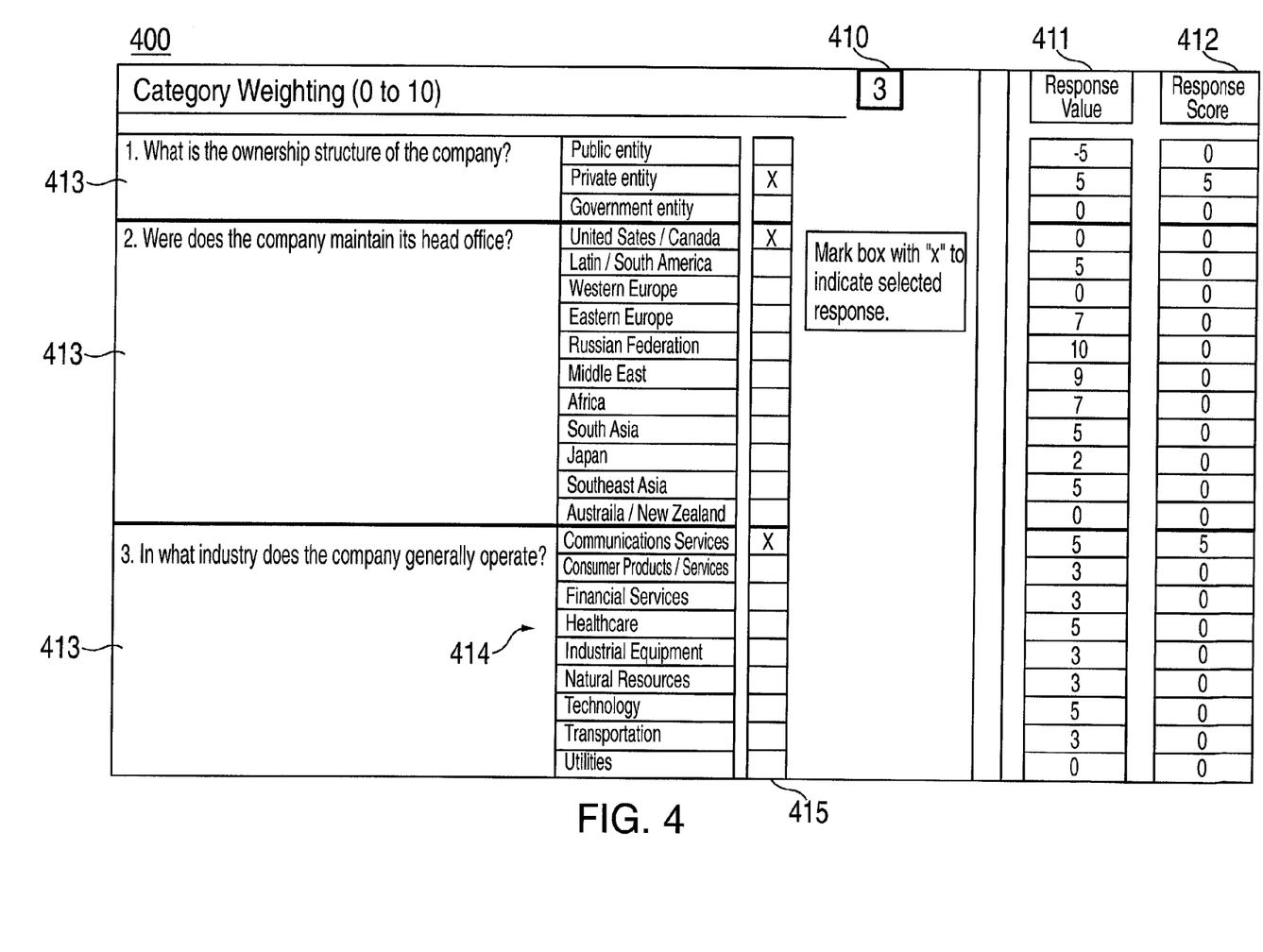
FIG. 4 illustrates an exemplary graphical user interface useful for gathering information according to the present invention.

Referring now to FIG. 4, an exemplary GUI for receiving information is illustrated 400. The GUI can include areas prompting for information, such as in the form of a question 413 and appropriate responses 414. A programmable user interactive device, such as a checkbox, X field, yes/no field or other device can be utilized to indicate an answer, or otherwise input information 415. A category weighting 410 can also be indicated on the GUI. Typically the weighting will be predetermined. However, if desired the weighting can be modified by a user. The receiving information GUI 400 can also include areas for displaying a response value 411 and a response score for the inquiry 412.

Figure 5:
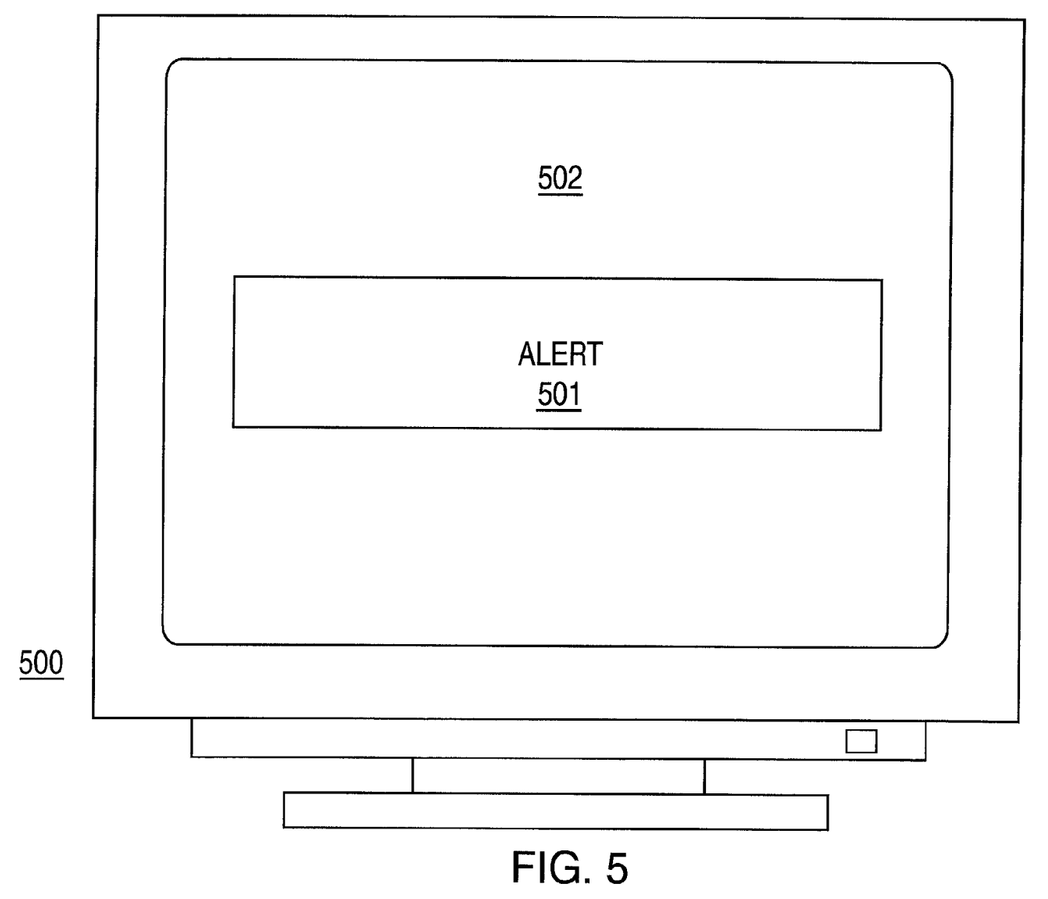
FIG. 5 illustrates an alert presented via a graphical user interface.

As illustrated in FIG. 5, an alert can be generated to be displayed on a GUI 500 in response to risk quotient value. For example, if a risk quotient indicates a high risk, an alert box 501 can be displayed over normal GUI content 502. Other forms of alerts, including an e-mail, a log, a textual report or limitation of available investment actions can also be utilized.

A number of embodiments of the present invention have been described. Nevertheless, it will be understood that various modifications may be made without departing from the spirit and scope of the invention. For example, network access devices 204-208 can comprise a personal computer executing an operating system such as Microsoft Windows™, Unix™, or Apple Mac OS™, as well as software applications, such as a JAVA program or a web browser. network access devices 204-208 can also be a terminal device, a palm-type computer, mobile WEB access device, a TV WEB browser or other device that can adhere to a point-to-point or network communication protocol such as the Internet protocol. Computers and network access devices can include a processor, RAM and/or ROM memory, a display capability, an input device and hard disk or other relatively permanent storage. Accordingly, other embodiments are within the scope of the following claims.

What is claimed is:

1. A computer-implemented method to manage risk related to opening a client account, the method comprising:
   receiving, into a computer system, client corporate structure information relating to a client seeking to open the client account, the corporate structure information including a plurality of data elements, wherein each data element has an assigned numerical risk level value representing a relative risk potential associated with that data element;
   structuring, by the computer, the received data elements according to a risk quotient criteria associated with a reputational risk of opening the client account, wherein structuring includes associating the received data elements to the risk quotient criteria, and wherein said reputational risk relates to a professional standing in an industry of an account opening entity providing the client account;
   assigning, by the computer, a predetermined weight to the risk quotient criteria according to relative importance of the risk quotient criteria;
   retrieving the risk level value corresponding to each data element;
   calculating, by the computer, a risk quotient based on the risk level value corresponding to each data element and the weight associated with the risk quotient criteria; and
   generating, by the computer, at least one suggested action based on the calculated risk quotient.

2. The method of claim 1, further comprising:
   storing data comprising the received data elements, the risk quotient, and the suggested action in a risk quotient criteria database; and
   generating a due diligence report based upon the stored data.

3. The method of claim 2, wherein the due diligence report comprises a history of inquiries made relating to the client account and actions taken based on the risk quotient.

4. The method of claim 1 further comprising:
   generating a graphical user interface on a network access device to facilitate opening a potential client account;
   displaying questions relating to the client account on the graphical user interface; and
   receiving data elements into the computer system responsive to the questions displayed.

5. The method of claim 1, wherein the received data elements are received from a source of electronic data.

6. The method of claim 1, wherein the suggested action is responsive to the received data elements.

7. The method of claim 1, wherein the suggested action is directed towards reducing at least one of a financial, legal, regulatory, and reputational risk associated with the client account.

8. The method of claim 1, wherein the suggested action comprises blocking an opening of the client account.

9. The method of claim 1, wherein the suggested action comprises notifying an authority concerning the received data elements.

10. The method of claim 1, wherein the received data elements are received electronically from an external database.

11. The method of claim 1, further comprising performing a calculation based on a risk assumed by a financial institution as represented by the risk quotient.

12. The method of claim 1, further comprising aggregating a plurality of risk quotients in order to calculate a total risk quotient representative of a total risk assumed by a financial institution.

13. The method of claim 1, further comprising calculating an average risk quotient based on a plurality of risk quotients for the client account.

14. The method of claim 1, wherein at least a portion of the received data elements are received in a pre-structured format.

15. The method of claim 1, wherein the risk quotient is calculated by multiplying a numerical value representative of a risk associated with the risk quotient criteria times a numerical value indicative of a category weighting.

16. A computerized system for managing risk associated with opening a client account, the system comprising:
   a computer server accessible with a network access device via a communications network; and
   executable software stored on the server and executable on demand, the software operative with the server to cause the system to:
      receive client corporate structure information relating to the client account, the corporate structure information including a plurality of data elements with an assigned numerical risk level value for each data element, wherein each assigned numerical risk level value represents relative risk potential associated with that data element;
      structure the received data elements according to a risk quotient criteria associated with a reputational risk of opening the client account, wherein structuring includes associating the received data elements to the risk quotient criteria, and wherein said reputational risk relates to an account opening entity providing the client account;
      assign a predetermined weight to the risk quotient criteria according to relative importance of the risk quotient criteria;
      retrieve a risk level value corresponding to each data element;
      calculate a risk quotient based on the risk level value corresponding to each data element and the weight associated with the risk quotient criteria; and
      generate at least one suggested action based on the calculated risk quotient.

17. The computerized system of claim 16, wherein the software is further operative to cause the system to:
   store data in a risk quotient criteria database, wherein the stored data includes the received data elements, the risk quotient, and the suggested action; and
   generate a due diligence report based upon the stored data.

18. The computerized system of claim 16, wherein the network access device is a personal computer.

19. The computerized system of claim 16, wherein the network access device is a wireless handheld device.

20. Computer executable program code residing on a computer-readable medium, the program code comprising instructions for causing the computer to:
   receive client corporate structure information relating to the client account, the corporate structure information including a plurality of data elements, wherein each data element includes an assigned numerical risk level value representing relative risk potential associated with that data element;
   structure the received data elements according to a risk quotient criteria associated with a reputational risk of opening the client account, wherein structuring includes associating the received data elements to the risk quotient criteria, and wherein said reputational risk relates to a professional standing in an industry of an account opening entity providing the client account;

assign a predetermined weight to the risk quotient criteria according to relative importance of the risk quotient criteria;

retrieve a risk level value corresponding to each data element;

calculate a risk quotient based on the risk level value corresponding to each data element and the weight associated with the risk quotient criteria; and generate a suggested action based on the calculated risk quotient.

21. The method of claim 9, wherein the authority is a government authority.

* * * * *